R. A. WEINHARDT.
CRANK SHAFT AND CONNECTING ROD ASSEMBLY.
APPLICATION FILED MAR. 11, 1916.

1,355,438.

Patented Oct. 12, 1920.
2 SHEETS—SHEET 1.

Witnesses
Chas. W. Stauffiger
Anna M. Dorr

Inventor
Robert A. Weinhardt.
By
Attorneys

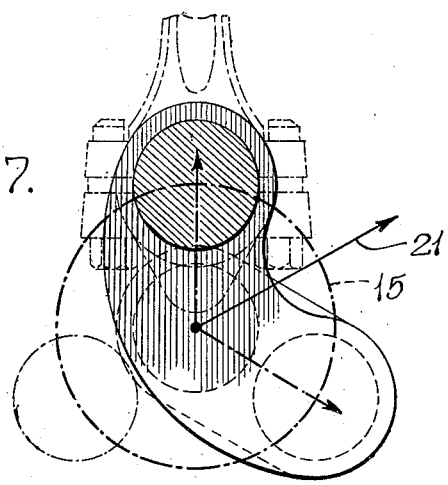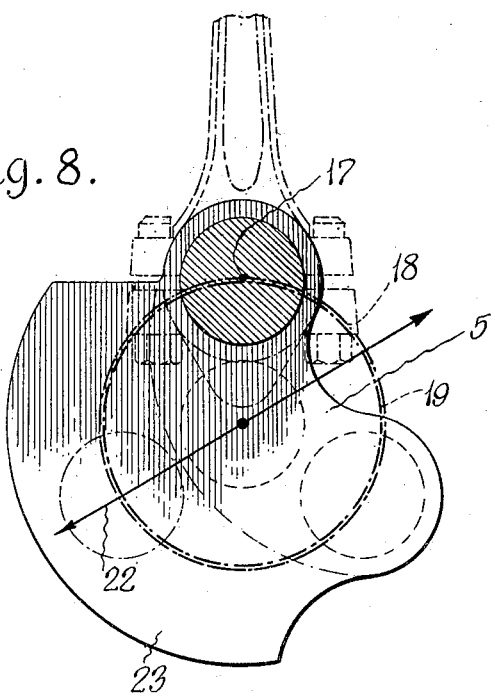

UNITED STATES PATENT OFFICE.

ROBERT A. WEINHARDT, OF CHICAGO, ILLINOIS, ASSIGNOR, BY MESNE ASSIGNMENTS, TO CONTINENTAL MOTORS CORPORATION, OF DETROIT, MICHIGAN, A CORPORATION OF VIRGINIA.

CRANK-SHAFT AND CONNECTING-ROD ASSEMBLY.

1,355,438.  Specification of Letters Patent.  Patented Oct. 12, 1920.

Application filed March 11, 1916. Serial No. 83,650.

*To all whom it may concern:*

Be it known that I, ROBERT A. WEINHARDT, a citizen of the United States of America, residing at Chicago, in the county of Cook and State of Illinois, have invented certain new and useful Improvements in Crank-Shaft and Connecting-Rod Assemblies, of which the following is a specification, reference being had therein to the accompanying drawings.

In the operation of high speed motors it is desirable that the crank shaft and rotating parts of the connecting rod assembly be so disposed and arranged as to maintain a running balance and thereby obviate any particular strain upon the bearings which would result from the turning moments of the parts, and the attempt thereof to swing into a position in which they will rotate on the shortest axis of mass.

This invention relates to a crank shaft and connecting rod assembly that is so disposed as to maintain a good running balance and to avoid any tendency of the shaft to flex between the bearings or to swing out of the major axis or axis of the crank shaft.

The invention consists in the matters hereinafter set forth, and more particularly pointed out in the appended claims.

In the drawings,

Fig. 7 is a diagrammatic view showing the resultants of the forces acting on a conventional crank shaft; and Fig. 8 is a diagrammatic view of the resultants of forces acting on a crank shaft with the arms in running balance.

Figure 6:
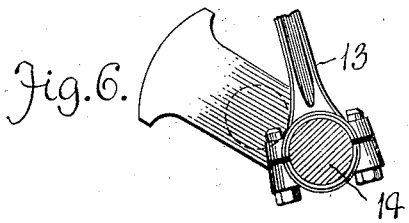
Fig. 6 is a view in detail corresponding to the sectional view 3 but showing a modification of the connecting rod.
Figure 1:
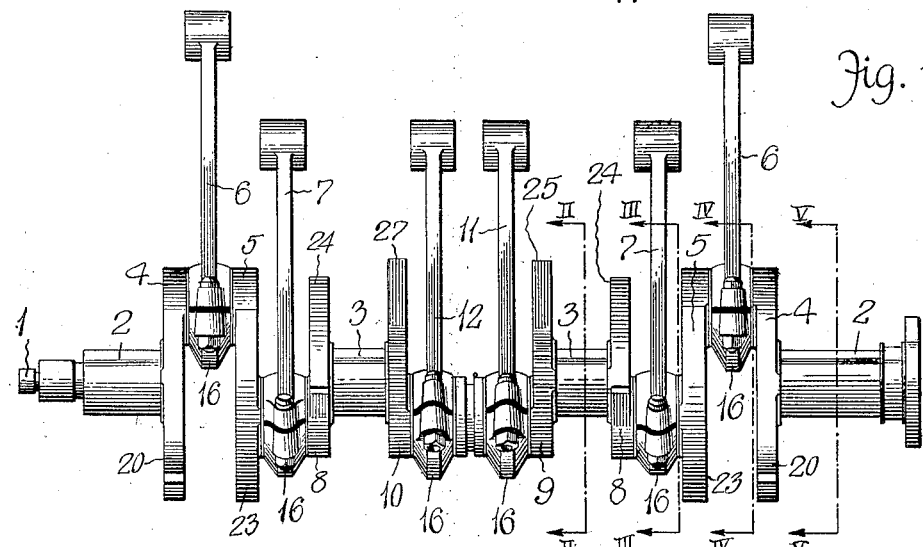
Figure 1 is a view of a crank shaft and the revoluble parts of a connecting rod assembly embodying features of the invention.
Figures 2, 3, 4, 5:
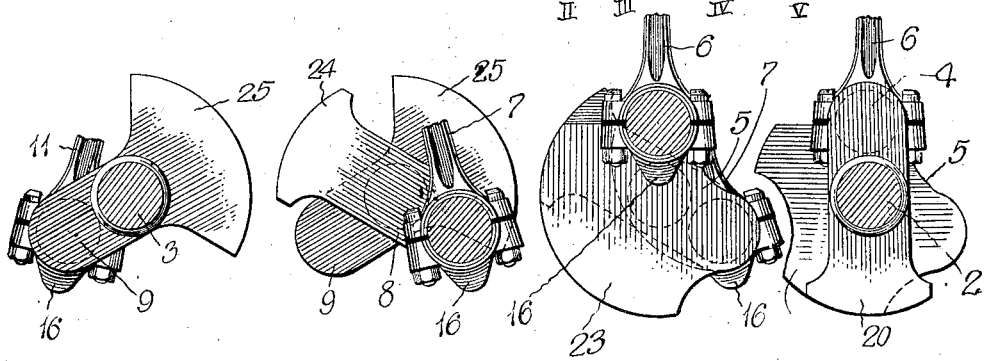
Fig. 2 is a view in section on or about line II—II of Fig. 1.
Fig. 3 is a view in section on or about line III—III of Fig. 1.
Fig. 4 is a view in section on or about line IV—IV of Fig. 1.
Fig. 5 is a view in section taken on or about lines V—V of Fig. 1.

Referring to the drawings, a crank shaft 1 which may be of either a single or multiple throw, but is herein shown as of a six throw, four-bearing type, has a pair of outer bearing or journal portions 2 and intermediate journals 3 with the crank pins arranged symmetrically in relation thereto so that the shaft is practically balanced when at rest. That is, a short arm 4 coöperates with a long arm 5 in reciprocating a connecting rod 6 that has wrist pin connection therewith, the long arm 5 likewise operating a connecting rod 7 in conjunction with a short arm 8 and a wrist pin connection. A pair of short arms 9 and 10 with appropriate wrist pin reciprocate a pair of connecting rods 11 and 12 while the remainder of the shaft is a duplication in inverse order of that portion first described.

Each of the connecting rods may be of the conventional type indicated in Fig. 6, at 13, but as in such connecting rod the center of mass of the revoluble part of the rod lies well away from the axis of the wrist pin 14, there is not only a bending moment imposed upon the connecting rod by the couple caused by the tendency of this center of mass to swing on the adjacent wrist pin bearing, but also a shifting of the said center of mass, as indicated in Fig. 7, in and out of the circle 15 that is described by the crank pin axis. This center of mass is hereinafter referred to as the "effective center of mass." Therefore it is desirable to bring the effective center of mass as nearly coincident with the crank pin axis as possible and accordingly the connecting rods are balanced dynamically by suitable application of weight as indicated at 16. Consequently the effective center of mass at 17, for example, is substantially coincident with the crank pin bearing axis and the orbit 18 thereof as indicated in Fig. 8, is practically the circle 19 described by the crank pin center. Therefore the balanced construction of the connecting rod renders its effect on the crank shaft, due to its weight, uniform throughout the crank throw and enables it to be balanced by the application of a suitable weight indicated at 20 to the short arm 4 and a weight 23 on the long arm 5.

Furthermore the application of the weight 23 is such that the resultant moment of the unbalanced long arm which is indicated by the line 21 in Fig. 7 is opposed by an opposite moment indicated by the line 22 in Fig. 8. As a result both the long and short connected arms and the interposed connecting rods run in true balance while the weight 23 on the long arm 5 is likewise arranged to take care of the connecting rod 7 in part, the remainder being balanced by a weight 24 on the short arm 8. Similarly the short arms 9 and 10 each account for their companion connecting rods 11 and 12 because of suitable extensions 25 on the arm 9 and 27 on the arm 10. The remainder of the shaft is of course symmetrical with the portions lying to the right of the center of the crank pins between the arms 9 and 10 and is balanced in a similar manner.

Consequently there is no tendency on the part of the shaft and the connecting rod assembly between each pair of bearings to turn on any axis of rotation that is not coincident with the main axis of the shaft. This of course is caused by the disposition of the mass of each irregular part and companion connecting rod so that the short axis of mass on which such part has the usual tendency to rotate is made coincident, or substantially so, with the axis of rotation of the main shaft itself.

As a result a crank shaft and connecting rod assembly is obtained that does not tend to weave or bind in the bearing, does not impose sidewise strain upon the bearings or otherwise prevent free running and consequent efficiency of transmission of power.

Obviously, changes in the details of construction may be made without departing from the spirit of my invention and I do not care to limit myself to any particular form or arrangement of parts.

What I claim is:

1. A crank shaft assembly for internal combustion engines comprising a six throw crank shaft having both long and short crank arms and journals at intervals, connecting rods having crank pin connections with the arms and counterbalance weights for each crank arm and associated connecting rod so disposed that the couples set up by the revolving parts are practically in equilibrium when turning whereby the parts when revolving tend to assume an axis of rotation coincident with the actual axis of rotation to which the shaft is confined.

2. In a crank shaft assembly for internal combustion engines, a crank shaft having short crank arms with crank pin connections adjacent journal portions of the shaft and long crank arm cheeks intermediate said portions, connecting rods for the crank arms portions so proportioned that the couples set up by the revoluble portions of the rods around the points of connection with the crank shaft practically neutralize each other and counter balances so disposed between the journals in relation to the crank arms and associated connecting rods that the couples set up by the shaft and associated parts around the axis of rotation of the shaft are practically neutralized and the axis of rotation which the shaft tends to assume is brought into substantial coincidence with the actual axis of rotation of the shaft.

3. A six throw crank shaft and connecting rod assembly for internal combustion engines comprising a crank shaft having both long and short crank arms and connecting rods operatively connected thereto and provided with counterbalanced portions integrally formed thereon and so disposed in relation to the crank arms and connected parts that the couples set up by the revolving parts around the respective centers of motion are practically neutralized and the axis of rotation which the assembled structure tends to assume is substantially coincident with the actual axis of rotation of the shaft.

In testimony whereof I affix my signature in presence of two witnesses.

ROBERT A. WEINHARDT.

Witnesses:
OTTO F. BARTHEL,
ANNA M. DORR.